(12) United States Patent
Ficnar

(10) Patent No.: US 12,361,445 B2
(45) Date of Patent: Jul. 15, 2025

(54) SYSTEMS AND METHODS OF LOG OPTIMIZATION FOR TELEVISION ADVERTISEMENTS

(71) Applicant: Known Global LLC, New York, NY (US)

(72) Inventor: Andrej Ficnar, Carmel, IN (US)

(73) Assignee: Known Global LLC, New York, NY (US)

( * ) Notice: Subject to any disclaimer, the term of this patent is extended or adjusted under 35 U.S.C. 154(b) by 0 days.

(21) Appl. No.: 17/884,514

(22) Filed: Aug. 9, 2022

(65) Prior Publication Data

US 2023/0039776 A1 Feb. 9, 2023

Related U.S. Application Data

(60) Provisional application No. 63/231,211, filed on Aug. 9, 2021.

(51) Int. Cl.
*G06Q 30/0241* (2023.01)
*G06N 5/022* (2023.01)

(52) U.S. Cl.
CPC ......... *G06Q 30/0241* (2013.01); *G06N 5/022* (2013.01)

(58) Field of Classification Search
None
See application file for complete search history.

(56) References Cited

U.S. PATENT DOCUMENTS

| | | | | |
|---|---|---|---|---|
| 6,285,995 | B1* | 9/2001 | Abdel-Mottaleb | G06F 16/5838 707/999.002 |
| 6,839,682 | B1* | 1/2005 | Blume | G06Q 30/0255 705/26.1 |
| 8,255,948 | B1* | 8/2012 | Black | H04N 21/812 725/35 |
| 8,554,618 | B1* | 10/2013 | Gasch | G06Q 30/0241 705/14.4 |
| 11,227,306 | B2* | 1/2022 | Haberman | G06Q 30/0244 |
| 2002/0103818 | A1* | 8/2002 | Amberden | G06F 16/972 |
| 2003/0101024 | A1* | 5/2003 | Adar | G06Q 30/02 707/E17.107 |
| 2008/0183554 | A1* | 7/2008 | Westphal | G06Q 30/0603 705/14.54 |
| 2008/0249832 | A1* | 10/2008 | Richardson | G06Q 30/0256 705/14.54 |

(Continued)

OTHER PUBLICATIONS

EComputer Notes, What is a Distributed Computing System? Definition, Capture date of Dec. 21, 2019 from URL https://ecomputernotes.com/computernetworkingnotes/computer-network/distributed-computing , Internet Archive Way Back Machine (Year: 2019).*

(Continued)

*Primary Examiner* — Saba Dagnew
(74) *Attorney, Agent, or Firm* — Wan Chich Lee; Haug Partners LLP

(57) ABSTRACT

Embodiments of the present invention provide systems and methods of log optimization for television advertisements. Exemplary method and systems can comprise: receiving, at a computer software platform, (i) the digital log, (ii) constraint parameters, and (iii) viewership predictions; and generating, with the computer software platform, an optimized log based on the received digital log, the constraint parameters, and the viewership predictions.

10 Claims, 8 Drawing Sheets

(56) References Cited

U.S. PATENT DOCUMENTS

| | | | | |
|---|---|---|---|---|
| 2009/0144117 | A1* | 6/2009 | Cavander | G06Q 30/0201 705/7.23 |
| 2011/0078013 | A1* | 3/2011 | Baker | G06Q 30/0275 705/14.42 |
| 2014/0194208 | A1* | 7/2014 | Splaine | G06Q 30/02 463/42 |
| 2014/0214548 | A1* | 7/2014 | Faltings | G06Q 30/0269 705/14.66 |
| 2015/0373387 | A1* | 12/2015 | Chaar | H04N 21/2547 725/35 |
| 2016/0098760 | A1* | 4/2016 | Keller | G06F 3/0482 705/14.66 |
| 2017/0064395 | A1* | 3/2017 | Chaar | H04N 21/812 |
| 2017/0220926 | A1* | 8/2017 | Chhabra | G06Q 50/01 |
| 2017/0315767 | A1* | 11/2017 | Rao | G09G 5/006 |
| 2018/0102938 | A1* | 4/2018 | Yoon | G06F 16/358 |
| 2018/0349946 | A1* | 12/2018 | Nguyen | G06Q 30/0244 |
| 2021/0287761 | A1* | 9/2021 | Camps | G16C 10/00 |
| 2021/0383425 | A1* | 12/2021 | Hrycay | G06Q 30/0264 |
| 2022/0067769 | A1* | 3/2022 | Ranganathan | G06Q 10/20 |

OTHER PUBLICATIONS

MIT, Integer programming, Internet Archive Way Back Machine Capture date of Oct. 5, 2019 from URL: https://web.mit.edu/15.053/www/AMP-Chapter-09.pdf (Year: 2019).*

Laurenti, A brief history of Graphs, Internet Archive Way Back Machine Capture date of Aug. 14, 2020 from URL: https://interworks.com/blog/nlaurenti/2014/10/20/brief-history-graphs/ (Year: 2020).*

Vegard Flovik, What is Graph Theory, and why should your care, Aug. 13, 2020, from URL: https://www.linkedin.com/pulse/what-graph-theory-why-should-you-care-vegard-flovik-phd (Year: 2020).*

Wikipedia, Interger programming, Internet Archive Way Back Machine capture date of Dec. 24, 2019 from URL https://en.wikipedia.org/wiki/Integer_programming (Year: 2019).*

* cited by examiner

FIG. 2

| Time | | | Initial Log | | |
|---|---|---|---|---|---|
| | No. | Attendees | CPM | Revenue | |
| 5:11 pm | 1 | C | $12.34 | $1,154 |
| 6:14 pm | 2 | B | $18.43 | $2,341 |
| 7:31 pm | 3 | A | $8.54 | $776 |
| 7:56 pm | 4 | B | $18.43 | $2,778 |
| 8:02 pm | 5 | A | $8.54 | $1,322 |
| | | | Total log value: | $8,371 |

| | | Optimal Log | | |
|---|---|---|---|---|
| No. | Attendees | CPM | Revenue |
| 4 | B | $18.43 | $2,378 |
| 5 | A | $8.54 | $1,105 |
| 3 | A | $8.54 | $776 |
| 1 | C | $12.34 | $2,820 |
| 2 | B | $18.43 | $2,220 |
| | | Total log value: | $9,299 |

|       | Ad #1 | Ad #2 | Ad #3 | Ad #4 | Ad #5 | ... |
|-------|-------|-------|-------|-------|-------|-----|
| Ad #1 |       | 15    | 10    | 0     | 5     |     |
| Ad #2 |       |       | 15    | 0     | 30    |     |
| Ad #3 |       |       |       | 10    | 5     |     |
| Ad #4 |       |       |       |       | 5     |     |
| Ad #5 |       |       |       |       |       |     |
| ...   |       |       |       |       |       |     |

|       | Ad #1 | Ad #2 | Ad #3 | Ad #4 | Ad #5 | ... |
|-------|-------|-------|-------|-------|-------|-----|
| Ad #1 |       | 1     | 1     | 0     | 0     |     |
| Ad #2 |       |       | 1     | 0     | 1     |     |
| Ad #3 |       |       |       | 1     | 0     |     |
| Ad #4 |       |       |       |       | 0     |     |
| Ad #5 |       |       |       |       |       |     |
| ...   |       |       |       |       |       |     | a clique

Process 300

SYSTEMS AND METHODS OF LOG OPTIMIZATION FOR TELEVISION ADVERTISEMENTS

CROSS-REFERENCE TO RELATED APPLICATION

This application claims the benefit of U.S. Provisional Patent Application No. 63/231,211, which was filed on Aug. 9, 2021 and is incorporated by reference in its entirety.

FIELD OF THE INVENTION

The present disclosure relates to systems and methods of log optimization for television (TV) advertisements.

BACKGROUND OF THE INVENTION

Log optimization is the process of finding a daily schedule of advertisements on a TV network (the log) that would maximize the advertising inventory value and reduce liability for the TV network publisher.

Advertising campaigns typically have (quarterly) viewership goals, for example 10 million P25-54 impressions in one quarter. TV network publishers try to fulfill these goals while being careful not to overdeliver, as that would amount to giving away advertising inventory for free. For that reason, campaigns typically underdeliver, resulting in a liability for the publisher, who then needs to make up this difference at some later time by issuing additional advertisements.

A log optimizer is an automated tool that programmatically ingests (i) the list of available advertisements, (ii) applicable constraints, and (iii) viewership prediction, and performs log optimization. The list of available advertisements includes the list of advertisements scheduled to air on a certain day, along with their various properties, such as what advertiser and brand they belong to, what product category they advertise, their length and cost, and many more. Often, these advertisements (or ads) are initially placed in certain times manually by the publisher's traffic team; this initial log is then submitted to the log optimizer to increase its overall delivery. The viewership predictions are predictions on how many viewers of a certain demographic will watch a certain program on the network. Together with ads' cost-per-thousand impressions (CPM), length, and the demographic, they form the predicted delivery of an ad, depending on what program the ad is placed in. The constraints correspond to a whole array of constraints that generally need to be satisfied by the ads that go on air. These include separation constraints, exclusions, time locks, and many others. The final, optimized log needs to respect these constraints before it can be allowed to go on air.

However, current log optimizers face a technical challenge: there can easily be over a thousand ads with hundreds, if not thousands, of constraints in a log, which renders the optimization problem very complex. One current solution employs greedy optimization techniques, as these can gradually find a better solution than the initial one, i.e. a log with a higher predicted delivery, no matter the amount of constraints.

Greedy optimization techniques are based on sequentially swapping pairs of ads if those swaps are allowed by the constraints and if the swaps will increase the overall predicted financial delivery of the log. As the optimizer performs allowed swaps, it slowly increases the predicted financial value of the log (FIG. 1 illustrates an example of an implementation of a greedy optimization technique), but once it gets to a point where no other swaps lead to a value increase (i.e. a local maximum), it stops.

FIG. 2 illustrates another example of an implementation of a greedy optimization technique. Specifically, the figure depicts a log with 5 ads and 5 slots in which those ads need to be placed. In this regard, there are two separation constraints: (i) ads of advertisers A and C cannot be placed closer than 20 minutes and (ii) ads of advertiser B need to be placed at least 30 minutes apart from each other. A greedy optimizer will not be able to swap ads 1 and 4 nor ads 5 and 2 in the initial log (indicated by the arrows), as these swaps would violate the separation constraints—even though these swaps might increase the overall log value. However, if these two swaps are performed simultaneously, one arrives at a log that respects all of the separation constraints, and has a higher predicted value ("Optimal Log" on the right).

In this example, there were only two simultaneous swaps, but, in principle, there can be any number of swaps that need to be performed simultaneously, and inspecting all possible combinations of those is an intractable problem for greedy optimizers typically used in current solutions for log optimization.

Because of this, greedy optimizers often end up missing out on a significant amount of additional revenue that can be attained with a global maximum solution, i.e. the solution with the highest possible predicted log value.

As such, it would be desirable to have systems and methods that could overcome these and other deficiencies of known systems.

SUMMARY OF THE INVENTION

Embodiments of the present invention relate to systems and methods for optimizing a digital log of available advertisements for a television network publisher.

According to an embodiment, a method for optimizing a digital log of available advertisements for a television network publisher comprises: receiving, at a computer software platform, (i) the digital log, (ii) constraint parameters, and (iii) viewership predictions; and generating, with the computer software platform, an optimized log based on the received digital log, the constraint parameters, and the viewership predictions.

According to an embodiment, a system for optimizing a digital log of available advertisements for a television network publisher comprises at least one computer, wherein: a computer software platform is implemented at the at least one computer; and the computer software platform is configured to (i) receive the digital log, constraint parameters, and viewership predictions and (ii) generate an optimized log based on the received digital log, the constraint parameters, and the viewership predictions.

Further, embodiments of the present invention can provide the following advantages: substantial increase in the execution of optimized logs compared to the current solutions based on greedy optimization; ability to optimize logs corresponding to multiple days and TV network publishers; as well as facilitating the ability to run AB tests and other benchmarks.

These and other advantages will be described more fully in the following detailed description.

BRIEF DESCRIPTION OF THE DRAWINGS

Some aspects of the disclosure are herein described, by way of example only, with reference to the accompanying drawings. With specific reference now to the drawings in detail, it is stressed that the particulars shown are by way of example and are for purposes of illustrative discussion of embodiments of the disclosure. In this regard, the description, taken with the drawings, makes apparent to those skilled in the art how aspects of the disclosure may be practiced.

FIG. 2 illustrates another example of an implementation of a greedy optimization technique.

DETAILED DESCRIPTION

Figure 1:
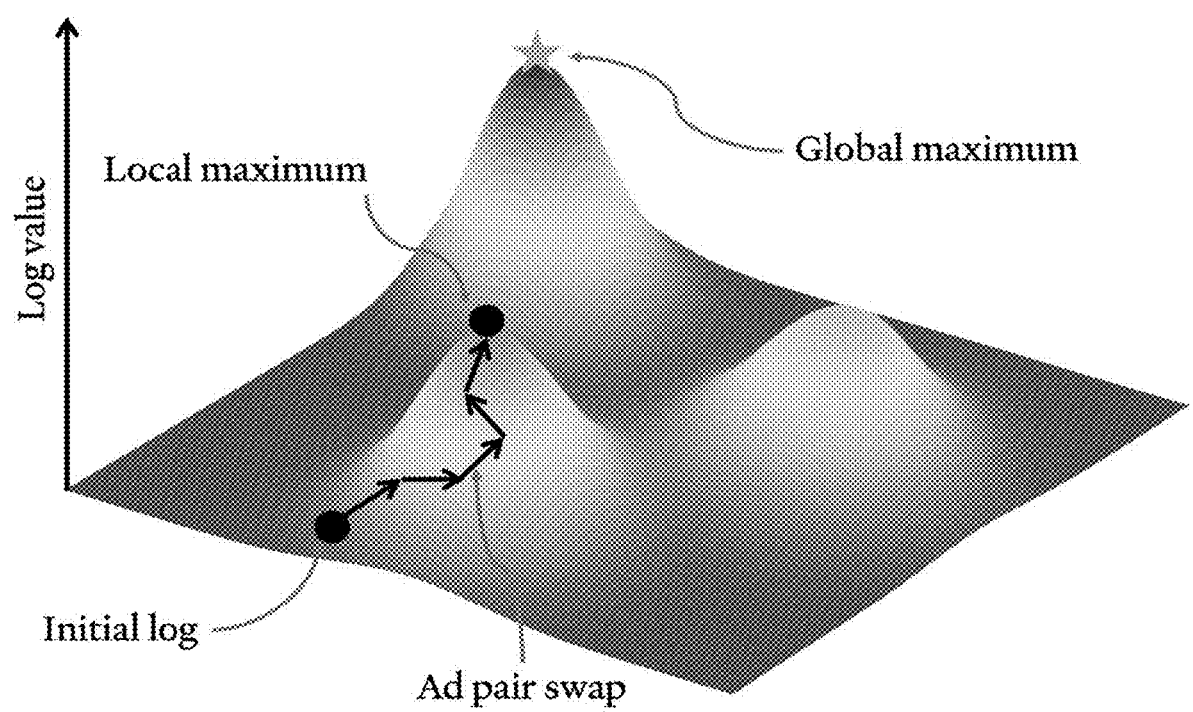
FIG. 1 illustrates an example of an implementation of a greedy optimization technique.

This description is not intended to be a detailed catalog of all the different ways in which the disclosure may be implemented, or all the features that may be added to the instant disclosure. For example, features illustrated with respect to one embodiment may be incorporated into other embodiments, and features illustrated with respect to a particular embodiment may be deleted from that embodiment. Thus, the disclosure contemplates that in some embodiments of the disclosure, any feature or combination of features set forth herein can be excluded or omitted. In addition, numerous variations and additions to the various embodiments suggested herein will be apparent to those skilled in the art in light of the instant disclosure, which do not depart from the instant disclosure. In other instances, well-known structures, interfaces, and processes have not been shown in detail in order not to unnecessarily obscure the invention. It is intended that no part of this specification be construed to affect a disavowal of any part of the full scope of the invention. Hence, the following descriptions are intended to illustrate some particular embodiments of the disclosure, and not to exhaustively specify all permutations, combinations and variations thereof.

Unless explicitly stated otherwise, the definition of any term herein is solely for identification and the reader's convenience; no such definition shall be taken to mean that any term is being given any meaning other than that commonly understood by one of ordinary skill in the art to which this disclosure belongs, unless the definition herein cannot reasonably be reconciled with that meaning. Further, in the absence of such explicit definition, all technical and scientific terms used herein have the same meaning as commonly understood by one of ordinary skill in the art to which this disclosure belongs. The terminology used in the description of the disclosure herein is for the purpose of describing particular embodiments only and is not intended to be limiting of the disclosure.

Unless the context indicates otherwise, it is specifically intended that the various features of the disclosure described herein can be used in any combination. Moreover, the present disclosure also contemplates that in some embodiments of the disclosure, any feature or combination of features set forth herein can be excluded or omitted.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

As used in the description of the disclosure and the appended claims, the singular forms "a", "an", and "the" are intended to include the plural forms as well, unless the context clearly indicates otherwise.

As used herein, "and/or" refers to and encompasses any and all possible combinations of one or more of the associated listed items, as well as the lack of combinations when interpreted in the alternative ("or").

According to an embodiment, an exemplary computer software platform is configured to find the log with the theoretically highest possible delivery by utilizing linear integer programming (LIP) optimization techniques, thereby allowing TV publishers to find the maximum possible revenue yield.

Figure 3:
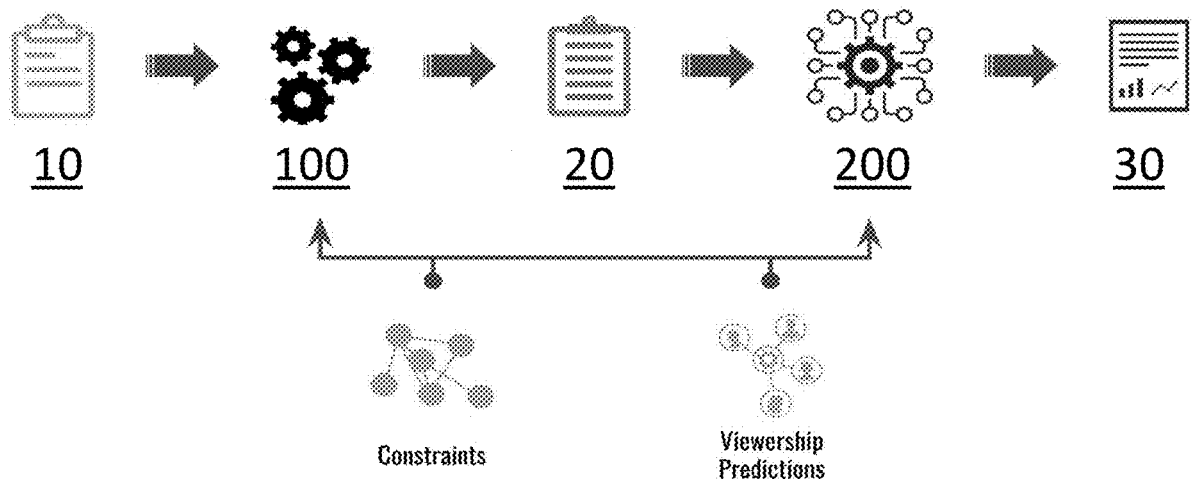
FIG. 3 illustrates an exemplary system for log optimization according to an embodiment of the invention.

FIG. 3 illustrates an exemplary system for log optimization according to an embodiment of the invention.

As depicted in the figure, an initial log 10 may be sent to a first log optimizer 100, which then generates a first optimized log 20. The first optimized log 20 may then be provided (e.g. uploaded) to the exemplary computer software platform 200, which then generates a further optimized log 30. Further, each of the first log optimizer 100 and the exemplary computer software platform 200 receives the same constraints and viewership prediction parameters, wherein the viewership prediction is based on a machine learning model, e.g. gradient boosted trees, autoregressive integrated moving average (ARIMA). According to an embodiment, the constraints can include separation constraints, exclusions, time locks, etc. Further, the machine learning models are configured to predict how many viewers of a certain demographic will watch a certain program on the network. In this regard, the machine learning model can be trained on a highly granular dataset containing TV viewing sessions of a tracked panel, e.g. Nielsen's All-Minute Respondent Level Data (AMRLD). Further, the machine learning model can be evaluated against training data. Further, the machine learning model can be re-trained on new data to improve accuracy. The viewership predictions, together with ads' cost-per-thousand impressions (CPM), length, and the demographic, form the predicted financial delivery of an ad, depending on what program the ad is placed in. Further, the exemplary computer software platform 200 may receive at least one of the initial log 10 or the first optimized log 20 from an ad trafficking server. Further, the further optimized log 30 may be provided back to the ad trafficking server, where the optimized log 30 may be executed (e.g. sent to air and played) by the TV network publisher. In this regard, after the advertisements from the optimized log 30 have aired, data regarding the airing can be provided by the TV network publisher to the exemplary computer software platform 200 so that the data can be analyzed, by the exemplary computer software platform 200, for the purposes of improving the viewership prediction model. First, the actualized financial lift is calculated as the difference in the financial delivery of the aired log and the delivery that the initial log 10/20 would have had, which are both based on the actual viewership data of the airing (e.g. using an audience measurement system, such as Nielsen's ratings). Then, the predicted lift is calculated similarly as the difference in the delivery of the optimized and the initial log, but based on the viewership prediction model. The actualized and the predicted lift are recorded and monitored over time, and when a discrepancy is detected due to changes in the viewership patterns, the machine learning-based viewership models can be retrained on updated information to account for those changes. According to an embodiment, the retraining can be performed using the exemplary computer software platform 200. According to another embodiment, the retraining can be performed on a computer distinct from the computer implementing the exemplary computer software platform 200.

If the ad trafficking server is a closed system and, therefore, prohibits importing a log from external sources, the exemplary computer software platform 200 can instead send the most valuable ad unit moves (i.e. manual user-directed swaps of advertisement in time slots of the log) to the ad trafficking server. For example, instead of generating a fully-optimized log, the exemplary computer software platform 200 can generate a log 30 that differs from the initial log 10/20 by at most N (20, 30, 40, etc.) moves, and with, that constraint, has the highest possible financial delivery. These N moves can be considered the most valuable moves. In this regard, the resulting log will not have a revenue as high as the further optimized log 30 but will nevertheless provide substantial financial lift, wherein the lift is based on the difference in revenues of the pre- and post-optimization using the exemplary computer software platform 200. According to another embodiment, the exemplary computer software platform 200 can receive the initial log 10 instead of the first optimized log 20.

Figure 4:
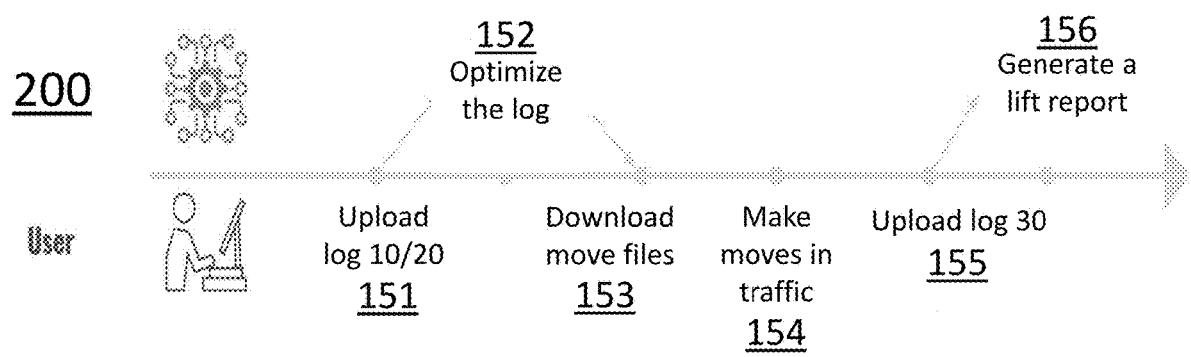
FIG. 4 illustrates an exemplary user interaction implementing log optimization according to an embodiment of the invention.

FIG. 4 illustrates an exemplary user interaction implementing log optimization according to an embodiment of the invention. As depicted in the figure, a process 150 includes a first step 151, in which the end user uploads, e.g. via a user interface on a computer, a log 10/20 to the exemplary computer software platform 200. According to an embodiment, the exemplary computer software platform 200 and the computer with the user interface can be implemented on the same or different computers. Then, in step 152, the exemplary computer software platform 200 optimizes the uploaded log 10/20. Then, in step 153, the end user can download a list of most valuable unit moves from the exemplary computer software platform 200. In this regard, the list of the most valuable moves can be an Excel file that instructs the users which advertisements need to be moved to what specific time slots. Then, in step 154, the end user can make one or more moves (e.g. manually swap advertisements in different time slots of the log) with the most valuable units, e.g. via the computer with the user interface. Then, in step 155, the end user can upload the log 30 to the exemplary computer software platform 200 for later financial lift calculation, wherein the lift is based on the difference in revenues of the pre- and post-optimization using the exemplary computer software platform 200. Lastly, in step 156, the exemplary computer software platform 200 generates a lift report based on the uploaded log 30.

Further, according to an embodiment, the exemplary computer software platform 200 can consider a log 10/20 as a collection of binary variables that indicate if a specific ad is in a specific slot—this collection can be considered the ad-slot vector. For example, for 10 ads and 10 slots, there are going to be 100 ad-slots, which represents all possible combinations (although these can be further reduced if certain ads are not allowed in certain slots). A specific log can then be a list of 100 binary numbers, where 1 indicates that a certain ad is in a certain slot, and 0 indicates that it is not.

Further, each advertiser constraint (e.g. a separation or an exclusion) is cast as a set of linear constraints for the ad-slot vector. The optimization goal is to maximize the dot product between the ad-slot vector and the list of predicted ad revenues for each ad-slot combination, based on the viewership predictions. The exemplary computer software platform 200 then utilizes LIP solvers to find the optimal ad-slot vector, or, equivalently, the log with the highest predicted value.

However, a complication in casting advertiser constraints as a set of linear constraints for the ad-slot vector are the separation constraints: these require ads of a certain kind to be separated from ads of another kind (or the same kind) by a certain number of minutes. Directly implementing these constraints in a LIP approach to log optimization for a typical, real-world log can result in tens of millions of constraints, which can make the problem practically intractable.

Therefore, in order to be able to use LIP for the logs 10/20, the amount of constraints must be reduced as much as possible. In this regard, the exemplary computer software platform 200 can employ an exemplary graph theory process that can allow it to drastically reduce the number of separation constraints and, therefore, make the entire optimization process for a typical log run much quicker, e.g. in only a few minutes on a single computer.

Figure 5:
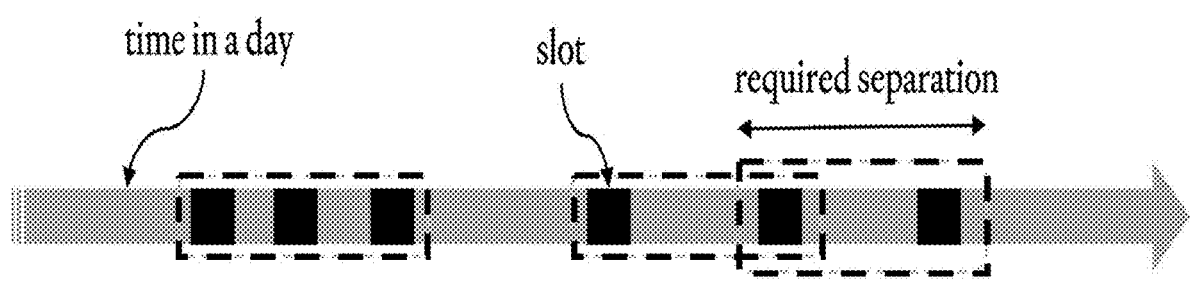
FIG. 5 illustrates an example of slots in a group of ads according to an embodiment of the invention.

According to an embodiment, the exemplary computer software platform 200 can find a group of ads that all need to be separated from each other by the same amount of time, wherein these group of ads can be called "ad-sep" groups. In this regard, for a given ad-sep group, the exemplary computer software platform 200 can go through the ordered list of slots and identify every group of slots (e.g. dashed rectangles in FIG. 5) such that all the slots in the group are separated by less than the separation requirement of the ad-sep group.

Then, the exemplary computer software platform 200 generates cross products between the ads in the ad-sep group and each of the slot groups (eliminating, along the way, any unallowed combinations), resulting in exclusive ad-slot groups. Therefore, each exclusive ad-slot group is a collection of ad-slot pairs such that if one of those pairs was populated (i.e. the ad from the pair was placed in the associated slot), no other pairs can be populated. The separation constraint then becomes a collection of linear constraints in which the sum of the ad-slot variables in each exclusive ad-slot group needs to be less than or equal to 1.

However, advertisers often have a lot of separation constraints, e.g. brand, advertiser, product, and others. Further, the constraints can be unit-type- and length-dependent, and so on. Further, there may be specific constraint violations that are sometimes allowed by the publisher's traffic teams. As such, for a generic log, it is challenging to find the ad-sep groups from above in a heuristic manner.

According to an embodiment, the exemplary graph theory process can be used to generate the ad-sep groups. In this regard, the exemplary computer software platform 200 can start with the construction of a constraint matrix of size N×N, where N is the number of ads in the log. Each entry in this matrix represents the final required separation between a pair of ads represented by the row and the column of the matrix. In the example in FIG. 6A, if ad #5 and ad #2 have an advertiser separation constraint of 20 minutes and a brand separation constraint of 30 minutes, the (5, 2) entry in the matrix will be 30 because it is the most restrictive requirement.

Figures 6A, 6B:
FIG. 6A illustrates an exemplary constraint matrix according to an embodiment of the invention.
FIG. 6B illustrates an exemplary binary matrix according to an embodiment of the invention.

For every distinct separation in the constraint matrix, the exemplary computer software platform 200 identifies all ad pairs that need to satisfy it, which turns the constraint matrix into a binary matrix (see example in FIG. 6B for separation of 10). That binary matrix can then be understood as an adjacency matrix: its entries encode the edges in a graph and ads represent the nodes. The problem of finding the ad-sep groups then becomes equivalent to finding maximal cliques, for which the exemplary computer software platform 200 uses packaged algorithms.

Maximal cliques are complete subgraphs with maximal order, i.e. largest collections of nodes that are all mutually connected. For example, as depicted in FIG. 6B, there is a first clique between nodes 2 and 5; a second clique between nodes 1, 2, and 3, and a third clique between nodes 3 and 4. Because of this, the above method minimizes the number of ad-sep groups generated, which translates into a drastically smaller amount of constraints, and, ultimately, to an optimization problem solvable in a reasonable amount of time.

According to an embodiment, further symmetrization of the constraint matrix can provide an additional reduction of the amount of constraints and speed up the process of optimization. The exemplary computer software platform 200 can use two heuristic methods for constraint matrix symmetrization.

The first method utilizes "1-per-break" constraints, which advertisers often have for specific groups of ads, to prevent them from appearing more than once in a commercial break. Because of these constraints, ads from such a group will never be able to come closer to each other than the smallest distance between the commercial breaks in a given log. The exemplary computer software platform 200 exploits this in the generation of the ad-sep groups for separations smaller than the smallest break distance, i.e. in the resulting graph (e.g. FIG. 6B), the edges connecting the ads that belong to the same 1-per-break group can be freely manipulated. Or, in other words, the exemplary computer software platform 200 can change their corresponding adjacency sub-matrices in a heuristic way to see which one will give the least amount of ad-sep groups. For example, in FIGS. 6A-6B, the smallest distance between the commercial breaks in the corresponding log can be 12 minutes, with ads #2 and #5 belonging to the same 1-per-break group, while ads #3 and #4 belong to another. In that case, for the separation distance of 10 mins in FIG. 6B, ads #2 and #5 (and similarly ads #3 and #4) can either have or not have an edge between them because those pairs of ads will never be closer to each other than 12 minutes. Choosing to have edges between those pairs of ads results in the graph in FIG. 6B and 3 ad-sep groups, while choosing not to have edges would result in a single ad-sep group (as ads #5 and #4 would not be connected to any ads), and therefore less constraints overall.

The second method for constraint matrix symmetrization is called the ad-sep group reduction cascade. In particular, the second method is utilized if there are still too many ad-sep groups generated (thereby resulting in a potentially very long optimization process).

In this regard, if the number of ad-sep groups is higher than the maximum allowed, the exemplary computer software platform 200 can progressively "freeze" more and more ads until the number of ad-sep groups falls under a predefined threshold and, therefore, becomes manageable. Freezing is comprised of consistent locking: the exemplary computer software platform 200 selects the ads to lock (i.e. not allow them to move from their initial slots) based on a heuristic method (for example, by looking at the highest degree nodes) and nulls out their corresponding rows and columns in the constraint matrix. This process simplifies the constraint matrix and reduces the amount of ad-sep groups. Further, because the separation constraints pertaining to the locked ads are not present anymore, the exemplary computer platform 200 can remove any ad-slot pairs that would put ads that need to be separated from the frozen ads that are too close to them; thereby simplifying the optimization even more by reducing its overall dimensionality. For example, in FIG. 6B, freezing ad #2 could comprise the following: i) ad #2 would be kept in its original spot from the initial log (say, slot #4), which means that all other ad-slots (i.e. ad-slots 2-1, 2-2, 2-3, and 2-5) would need to be removed; ii) any edges that connect ad #2 to any other ad would need to be removed, which in this example would reduce the number of ad-sep groups from 3 to 2: one clique would contain ads #1 and #3, and the other would contain ads #3 and #4; iii) because there are no longer separation constraints preventing, for example, ad #5 to appear within 10 minutes of ad #2, all ad slots that would put ad #5 in a slot that's within 10 minutes of slot #4 (in which ad #2 is fixed) would need to be removed.

Figure 7:
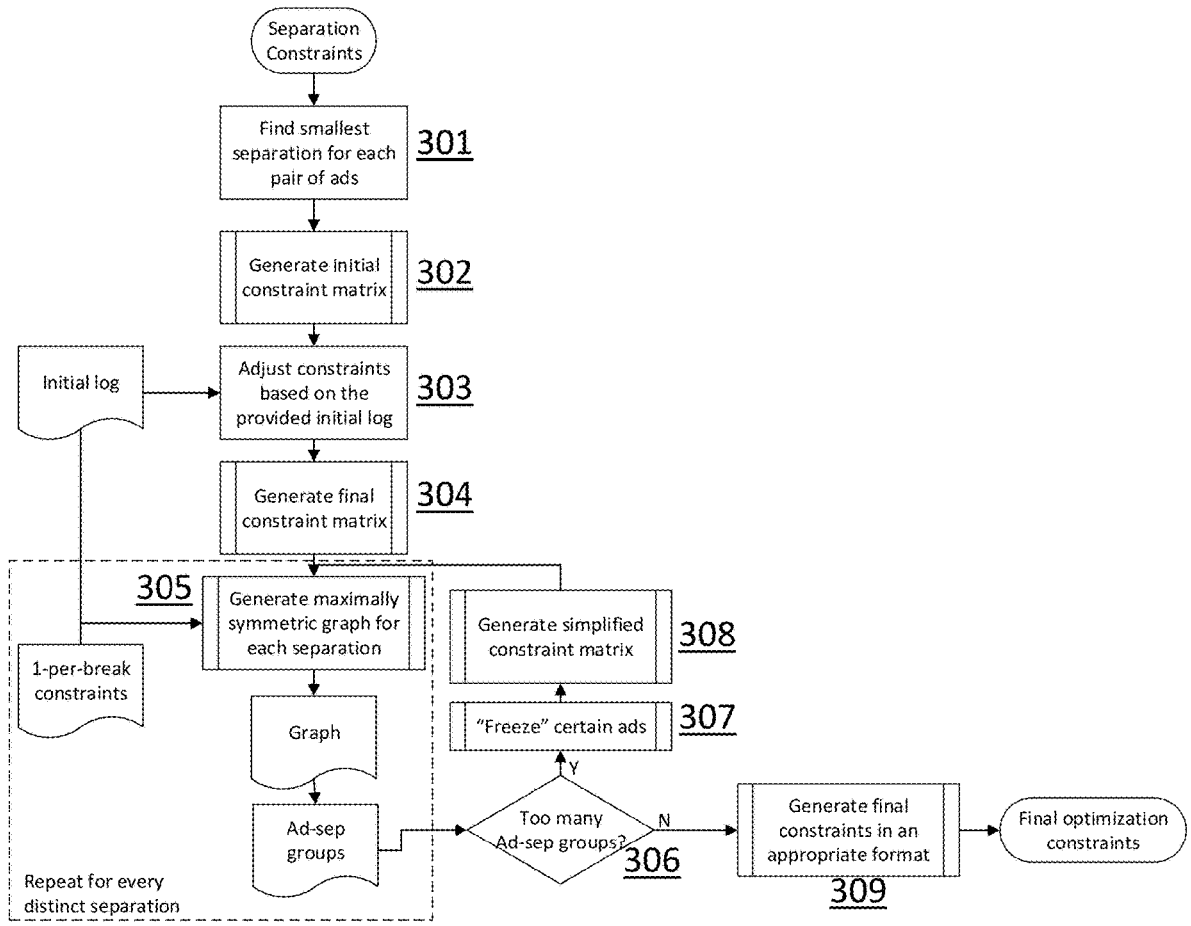
FIG. 7 illustrates an exemplary process for handling separation constraints according to an embodiment of the invention.

FIG. 7 illustrates an exemplary process for handling separation constraints according to an embodiment of the invention. As depicted in the figure, a process 300 includes a first step 301, in which the exemplary computer software platform 200 receives, as inputs, the separation constraints and then determines the smallest separation for each pair of ads. Then, in step 302, the exemplary computer software platform 200 generates an initial constraint matrix. Then, in step 303, the exemplary computer software platform 200 adjusts the constraints based on the provided initial log. After which, the exemplary computer software platform 200 generates the final constraint matrix as depicted in step 304. Then, in step 305, for every distinct separation, and using the 1-per-break constraints, the exemplary computer software platform 200 generates a maximally symmetric graph, from which the least amount of ad-sep groups can be determined. Then, in step 306, the exemplary computer software platform 200 determines if there are too many ad-sep groups. If it is determined that there are too many ad-sep groups, then, in step 307, the exemplary computer software platform 200 can "freeze" certain ads as described above. After which, in step 308, the exemplary computer software platform 200 generates a simplified constraint matrix, and then repeats step 305 with the simplified constraint matrix (and, therefore, also steps 306, 307, and 308) until the amount of ad-sep groups fall below a predefined threshold. In this regard, if it is determined in step 306 that the amount of ad-sep groups fall below a predefined threshold, then, in step 309, the exemplary computer software platform 200 generates the final constraints in an appropriate format, e.g. LIP format.

Figure 8A:
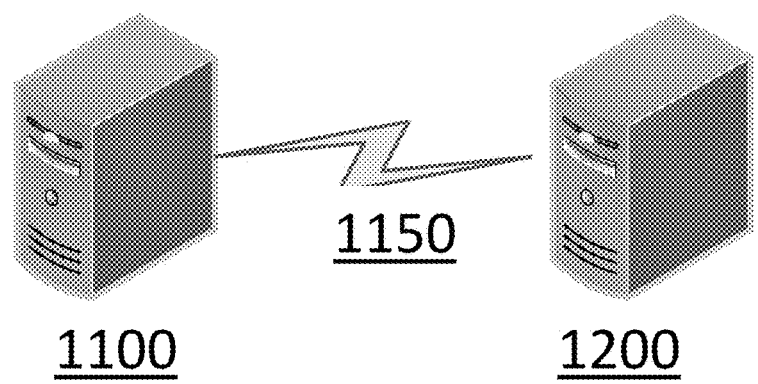
FIG. 8A illustrates an exemplary system for log optimization according to an embodiment of the invention.

FIG. 8A illustrates an exemplary system for log optimization according to an embodiment of the invention. According to an embodiment, a system 1000 can include an ad trafficking server 1100, at least one computer 1200, and a communication network 1150 connecting the ad trafficking server 1100 and the at least one computer 1200.

According to an embodiment, the processes described above, e.g. processes 150 and 300, can be implemented in the ad trafficking server 1100 and the at least one computer 1200. In this regard, the exemplary computer software platform 200 can be implemented in the at least one computer 1200.

Further, according to an embodiment, the communications network 1150 can include, or can interface to, at least one of the Internet, an intranet, a local area network (LAN), a wide area network (WAN), a metropolitan area network (MAN), a storage area network (SAN), a frame relay connection, an advanced intelligent network (AIN) connection, a synchronous optical network (SONET) connection, a digital T1, T3, E1 or E3 line, a digital data service (DDS) connection, a digital subscriber line (DSL) connection, an Ethernet connection, an integrated services digital network (ISDN) line, a dial-up port such as a V.90, a V.34 or a V.34bis analog modem connection, a cable modem, an asynchronous transfer mode (ATM) connection, a fiber distributed data interface (FDDI) connection, a copper distributed data interface (CDDI) connection, or an optical/DWDM network. In another embodiment, the communications network 1150 can include, or can interface to, at least one of wireless application protocol (WAP) link, a Wi-Fi link, a microwave link, a general packet radio service (GPRS) link, a global system for mobile Communication (GSM) link, a Code Division Multiple Access (CDMA) link or a time division multiple access (TDMA) link such as a cellular phone channel, a GPS link, a cellular digital packet data (CDPD) link, a Research in Motion, Limited (RIM) duplex paging type device, a Bluetooth radio link, or an IEEE 802.11-based radio frequency link. Further, in another embodiment, the communications network 1150 can include, or can interface to, at least one of an RS-232 serial connection, an IEEE-1394 (FireWire) connection, a Fibre Channel connection, an infrared (IrDA) port, a small computer systems interface (SCSI) connection, a universal serial bus (USB) connection or another wired or wireless, digital or analog interface or connection.

Figure 8B:
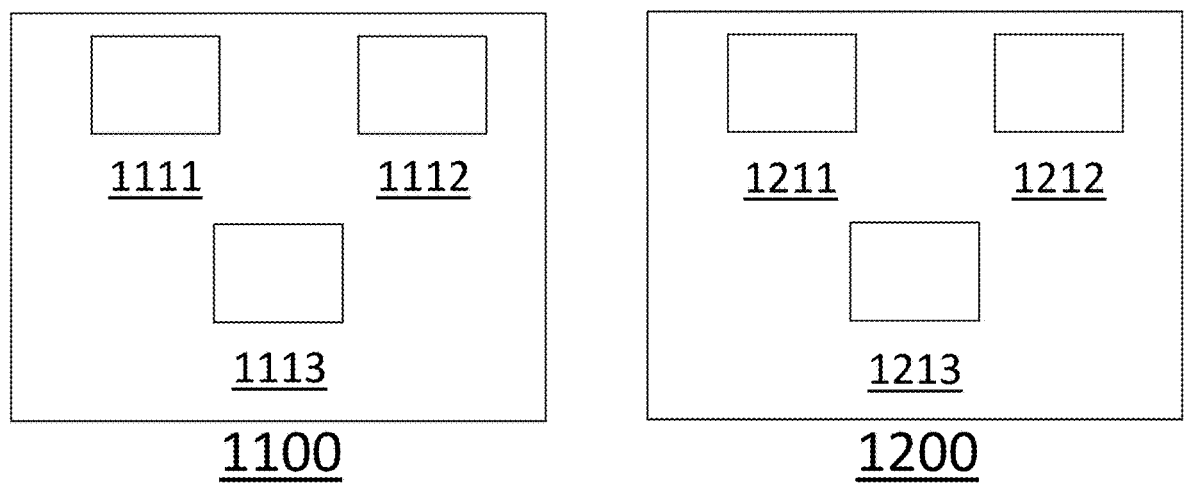
FIG. 8B depicts components of the advertisement trafficking server 1100 and the at least one computer 1200 in FIG. 8A.

FIG. 8B depicts components of the ad trafficking server 1100 and the at least one computer 1200 in FIG. 8A. As depicted in the figure, each of the ad trafficking server 1100 and the at least one computer 1200 include a respective memory (e.g. memories 1111 and 1211), processor (e.g. processors 1112 and 1212), and representational state transfer application programming interface (RESTful API) (e.g. APIs 1113 and 1213). According to an embodiment, the memories 1111 and 1211 can be used to store computer instructions and data including any and all forms of non-volatile memory, including semiconductor devices (e.g. SRAM, DRAM, EPROM, EEPROM, and flash memory devices), magnetic disks (e.g. internal hard disks or removable disks), magneto-optical disks, and CD-ROM and DVD-ROM disks. Further, the processors 1112 and 1212 can be suitable for the execution of a computer program, e.g. part or all of the processes 150 and 300, and can include both general and special purpose microprocessors, as well as any one or more processors of any kind of digital computer. Further, the processors 1112 and 1212 can receive instructions and data from the memories 1111 and 1211, e.g. to carry out at least part or all of the processes 150 and 300. Further, the APIs 1113 and 1213 can be used to transmit relevant data to and from the servers the ad trafficking server 1100 and the at least one computer 1200.

According to an embodiment, with the exemplary methods and systems, logs corresponding to multiple days and/or TV network publishers can be optimized in an efficient manner.

Further, the exemplary methods and systems also facilitate the running of A/B tests and other benchmarks. In this regard, A/B tests refer to the simulations of two separate scenarios: one that corresponds to how the exemplary computer software platform 200 operates in a specific implementation (scenario "A" or the control arm) and another which differs from scenario A in as single, specific way (scenario "B" or the test arm). For example, the B scenario could have a single set of constraints altered with respect to the A scenario to evaluate the effect the constraints have on delivery. Further, the B scenario could correspond to a new model of viewership predictions to test if that model results in a higher delivery compared to the model currently in use. For each scenario, the exemplary computer software platform 200 can be executed over the historical logs and the difference in delivery between A and B scenarios can be calculated to estimate if scenario B is beneficial.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

The foregoing detailed description of the present disclosure is to be understood as being in every respect illustrative and exemplary, but not restrictive, and the scope of the present disclosure provided herein is not to be determined solely from the detailed description, but rather from the claims as interpreted according to the full breadth and scope permitted by patent laws. It is to be understood that the embodiments shown and described herein are merely illustrative of the principles addressed by the present disclosure and that various modifications may be implemented by those skilled in the art without departing from the scope and spirit of the present disclosure. Those skilled in the art may implement various other feature combinations without departing from the scope and spirit of the present disclosure. The various functional modules shown are for illustrative purposes only, and may be combined, rearranged and/or otherwise modified.

The invention claimed is:

1. A method for optimizing a digital log of N available advertisements for a television network publisher, the method comprising:
  (a) receiving, by a computer, (i) the digital log, (ii) constraint parameters, and (iii) viewership predictions, each for the N available advertisements;
  (b) generating, by the computer, a constraint matrix of size N×N, wherein each entry in the constraint matrix corresponds to a separation time between two of the available advertisements in the digital log, the separation time determined based on the constraint parameters of the two available advertisements;
  (c) analyzing, by the computer, the constraint matrix using a graph theory process to separate the available advertisements into a number of groups based on the separation times provided in the constraint matrix based on the separation times in the constraint matrix, wherein the number of groups correspond to maximal cliques of the constraint matrix as determine by the group theory process, wherein each group consists of a portion of the available advertisements all having separation times less than a threshold amount;

(d) if the number of groups is greater than a predetermined threshold, applying, by the computer, a further constraint selected from (i) preventing a group of the available advertisements from appearing more than once in a commercial break, or (ii) freezing a portion of the available advertisements to initial advertisement slots, and repeating steps (c) and (d) with the further constraint to further reduce the number of groups until the reduced number of groups is below the predetermined threshold;

(e) generating, with the computer, an optimized log using a linear integer programming (LIP) optimization process based on the reduced groups of available advertisements and the viewership predictions, wherein the optimized log comprises an updated schedule for airing the N available advertisements;

(f) transmitting the optimized log from the computer to an advertisement trafficking server; and (g) moving and airing, by the advertisement trafficking server, the N available advertisements according to the updated schedule of the optimized log.

2. The method of claim 1, wherein the digital log is a list of the available advertisements for the television network publisher or an optimized list of the available advertisements for the television network publisher.

3. The method of claim 1, wherein the constraint parameters include one at least one of: separation constraints, exclusions, and time locks, wherein the viewership predictions are based on a machine learning model, and wherein the machine learning model is configured to predict a number of viewers of a certain demographics that will watch a certain program.

4. The method of claim 3, further comprising:

transmitting, with the advertisement trafficking server, data associated with the moving and airing of the N available advertisements according to the updated schedule of the optimized log to the computer;

retraining, with the computer, the machine learning model with the transmitted data.

5. The method of claim 1, further comprising:

generating, with the computer, a report including a difference of a first revenue associated with the digital log and a second revenue associated with the optimized log.

6. A system for optimizing a digital log of N available advertisements for a television network publisher, the system comprising:

at least one computer comprising a processor configured to execute instructions, wherein the instructions cause the processor to perform operations comprising:

(a) receiving, by a computer, (i) the digital log, (ii) constraint parameters, and (iii) viewership predictions, each for the N available advertisements, (b) generating, by the computer, a constraint matrix of size N×N, wherein each entry in the constraint matrix corresponds to a separation time between two of the available advertisements in the digital log, the separation time determined based on the constraint parameters of the two available advertisements;

(c) analyzing, by the computer, the constraint matrix using a graph theory process to separate the available advertisements into a number of groups based on the separation times provided in the constraint matrix based on the separation times in the constraint matrix, wherein the number of groups correspond to maximal cliques of the constraint matrix as determine by the group theory process, wherein each group consists of a portion of the available advertisements all having separation times less than a threshold amount, (d) if the number of groups is greater than a predetermined threshold, applying, by the computer, a further constraint selected from (i) preventing a group of the available advertisements from appearing more than once in a commercial break, or (ii) freezing a portion of the available advertisements to initial advertisement slots, and repeating steps (c) and (d) with the further constraint to further reduce the number of groups, until the reduced number of groups is below the predetermined threshold, and (e) generating, with the computer, an optimized log using a linear integer programming (LIP) optimization process based on the groups of available advertisements, wherein the optimized log comprises an updated schedule for airing the N available advertisements; and an advertisement trafficking server configured to receive the optimized log from the at least one computer, and configured to move and air the N available advertisements according to the updated schedule of the optimized log.

7. The system of claim 6, wherein the digital log is one of a list of the available advertisements for the television network publisher or an optimized list of the available advertisements for the television network publisher.

8. The system of claim 6, wherein the constraint parameters include one at least one of separation constraints, exclusions, and time locks, wherein the viewership predictions are based on a machine learning model, wherein the machine learning model is configured to predict a number of viewers of a certain demographics that will watch a certain program.

9. The system of claim 8, wherein the advertisement trafficking server is configured to transmit data associated with the moving and airing of the N available advertisements according to the updated schedule of the optimized log to the computer, and wherein the computer is configured to retrain the machine learning model with the transmitted data.

10. The system of claim 6, wherein the computer is further configured to:

generate a report including a difference of a first revenue associated with the digital log and a second revenue associated with the optimized log.

* * * * *